United States Patent

[11] 3,629,051

| [72] | Inventor | Wilbur A. E. Mitchell |
| --- | --- | --- |
| | | Greeley, Colo. |
| [21] | Appl. No. | 829,869 |
| [22] | Filed | June 3, 1969 |
| [45] | Patented | Dec. 21, 1971 |
| [73] | Assignee | Mitchell Tackle, Inc. |
| | | Greeley, Colo. |
| | | The portion of the term of the patent subsequent to Mar. 30, 1988, has been disclaimed. |

[54] NONSLIP ARTICLE OF MANUFACTURE AND PROCESS FOR MAKING SAME
15 Claims, 3 Drawing Figs.

[52] U.S. Cl. .................................................. 161/162,
36/32, 36/59, 106/38, 161/168, 260/41.5
[51] Int. Cl. .................................................. A43b 13/22,
B32b 5/16, C09k 3/14
[50] Field of Search .......................................... 161/162,
168; 260/41.5; 36/32, 59; 106/38

[56] References Cited
UNITED STATES PATENTS

| 1,591,018 | 7/1926 | Cutler | 36/59 |
| --- | --- | --- | --- |
| 2,084,784 | 6/1937 | Stahl | 36/59 |
| 2,143,897 | 1/1939 | Oriola | 260/41.5 UX |
| 2,171,438 | 8/1939 | Tarbox | 156/114 |
| 2,336,388 | 12/1943 | Beebe | 161/243 |
| 2,643,234 | 6/1953 | Backus | 260/41.5 |
| 3,344,094 | 9/1967 | deGaugue | 260/41.5 |
| 3,475,205 | 10/1969 | Byers | 260/41.5 |

Primary Examiner—John T. Goolkasian
Assistant Examiner—George W. Moxon, II
Attorney—Wilbur A. E. Mitchell

ABSTRACT: A nonslip surface article and the method of forming the same of an uncured elastomeric matrix impregnated with waste aluminum particles interlocked therein.

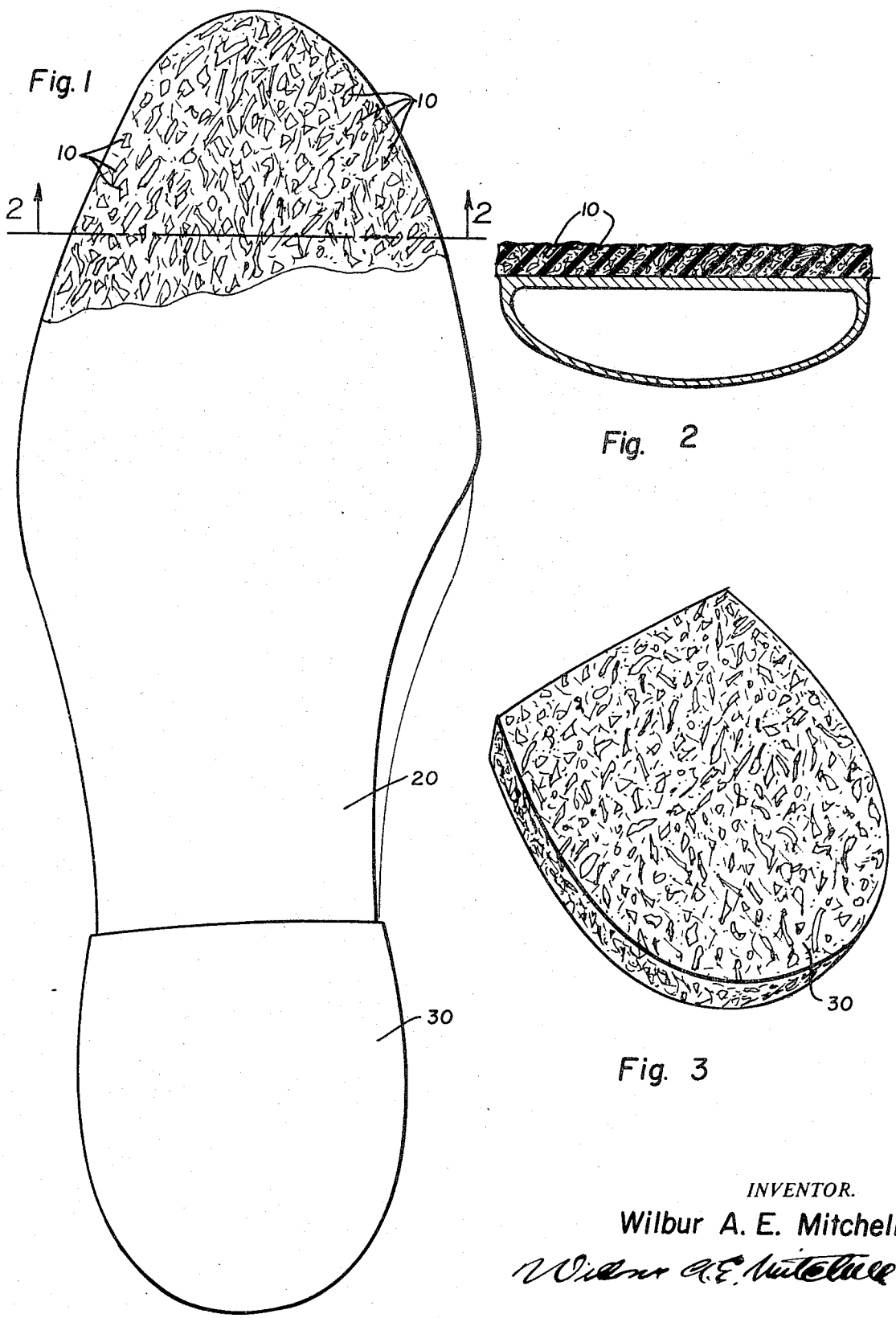

NONSLIP ARTICLE OF MANUFACTURE AND PROCESS FOR MAKING SAME

This invention is a continuation-in-part of my copending application, Ser. No. 730,181, filed May 17, 1968 now U.S. Pat. No. 3,573,155, issued March 30, 1971, and entitled Nonslip Article of Manufacture.

This invention relates to nonslip surfaces, and particularly to nonslip surfaces of an elastomeric character having gripping particles embedded into the elastomer. While the invention may be used for other types of nonslip surfaces, it will be hereinafter described in connection with the preferred use, that is for footwear.

The invention hereinafter set forth in detail, comprises, in essence, a sheeting or layer of elastomeric material, such as rubber, having a myriad of aluminum chips impregnated therein, the pad constituting a matrix wherein the aluminum chips are adhesively and/or mechanically bonded and held in place, with each chip interlocking into the elastomeric matrix. My invention includes the producing of this improved antislip surface, either as a pad, sheet or layer, according to the surface desired and the manner in which it is to be attached to a sole of a shoe. My method comprises, in essence, the impregnation of selected prepared aluminum in a fluid or plastic body of unfinished elastomer in suitable proportion and to form the same in a desired shape either as a pad, layer or sheet, either in a mold of proper form or directly on the sole of a shoe. The elastomer is permitted to cure or finish into a resilient or elastic state. Unless applied directly to a shoe sole, the pad or sheet is properly shaped and then is attached to a shoe sole directly or with the aid of a suitable adhesive, as hereinafter set forth in detail.

My invention has a particular utility in connection with outdoor footwear, and particularly in connection with fishing boots because of the problems encountered in their use. Soles of fishing boots heretofore are ordinarily made of rubber, and while rubber itself is an excellent nonslip material on dry rocks and dry surfaces, it can become especially slippery on wet surfaces, and especially on wet rocks and wooden surfaces which may carry a growth of moss or algae. This slipping has been a constant problem to a sportsman. Several attempts have been made to remedy this undesirable situation, especially with fishing boots, and a common makeshift solution resides in affixing felt soles to the bottom of such boots by a suitable adhesive. The primary disadvantage of this approach resides in the fact that the felt soles are quickly worn away and also that they are quite expensive. Heretofore attempted and generally found to be unsuccessful has been to clamp aluminum plates onto the soles and heels of fishing boots, because it has been discovered that aluminum has unusual tenacity for adhering to wet rocks and even wet boards. Objections to such cleats has been that they are cumbersome and cannot be satisfactorily held onto the sole of a fishing boot. It has also been proposed to embed inserts into the body of the sole of rubber boots, as nonslip surfaces in the type commonly used for industrial uses, as well as for other surfaces. Particles of metal have been imbedded in rubber in order to provide such a surface. However, in the prior art, the problem of holding metal particles in the rubber has been rendered quite difficult because of the inability of those particles to properly bond to rubber or other elastomers such as Neoprene. In 1937, the patent to Stahl, U.S. Pat. No. 2,084,784, discloses the embedding of an abrasive or like particles in the rubber, and, further, that where metal was used that it should be brass, or if another type of metal was used that it should be brass plated, since one of the peculiar qualities of brass is to adhere to rubber, The publication entitled "The Neoprenes" of Murray & Thompson, in 1963, copyrighted by E. I. DuPont De Nemours and Company, has a statement at page 74 to the effect that Neoprene compounds containing elementary sulfur may be bonded to ordinary yellow base, either a solid piece of brass or brass that has been electroplated onto steel, and that this procedure of adhering particles to elastomer has not significantly changed. An application, such as applying lugs of aluminum or such material to the sole of a boot in a preparation would be unduly expensive. Heretofore, as far as known, aluminum has not been successfully used as a particular material to be embedded in an elastomer for antislip purposes because the same cannot be made to effectively adhere to the rubber and remain in place. In other words, after a short period of use, aluminum lugs, embedded into the rubber surface to serve antislip purposes, come loose and are lost.

A paramount feature of the present invention resides in the discovery that aluminum particles obtained from cuttings from lathes, milling machines and the like, hereinafter called mill shavings, cuttings or chips, have the unusual properties of embedding themselves into a matrix formed by an elastomer in such a manner as to remain in place even though the surfaces of the aluminum chips are not fully and effectively bonded to the elastomer in such a manner as to have an intimate contact. The interlocking of the chips is brought about because of the unusual configuration of comparatively thin surfaces of the chips interlocking themselves into the matrix, as hereinafter set forth. Configurations of the chips lend to the effective interlocking action of the chips obtained in this invention.

An object of this invention is to provide a novel and improved antislip surface formed as a pad, sheet or layer, which will be hereinafter generally referred to as an antislip surface which takes advantage of the inherent properties of aluminum of resistance to slipping, with the structure of the antislip surface being formed in a manner which permits the same to be easily applied to the surface of the sole of a fishing boot or the like.

Another object of the invention is to provide a novel and improved antislip surface for boots and the like of an elastomeric matrix, with aluminum chips of the form which are inherently interlocked into the matrix in an arrangement which effectively holds and retains the same while at the same time posing an effective antislip outer surface.

Another object of the invention is to provide, in a novel and improved antislip surface, the combining of aluminum chips in an elastomeric matrix, with said chips of a form which may be easily and economically obtained, such as machine cuttings normally considered as a waste product.

Another object of my invention is to provide a novel and improved antislip surface which can be made with any of a number of easily obtained elastomers, including natural rubber, without the need for special processes and apparatus to cure the elastomer to the resiliency desired.

Another object of this invention is to provide a novel and improved elastomeric antislip surface by interblending aluminum chips in an uncured or unfinished elastomer matrix which may be adapted for intermediate application or for finishing into a boot surface or set aside for a substantial period of time, the same having a good shelf life for subsequent use as desired.

Another object of this invention is to provide a novel and improved antislip surface by combining and interblending aluminum chips in an elastomer matrix wherein the operational steps of forming the same are simple, easy and with the final product a rugged reliable, and low-cost long wearing soles for boots and the like.

Another object of this invention is to provide, in an improved antislip surface, combining an elastomer and aluminum chips, the method of combining the same wherein a synergistic oxidizing action is obtained between the aluminum chips and the elastomer to facilitate and inherently finish the elastomer into a dense body of selected resilience without the addition of special oxides and the like being required in the final product.

The foregoing and other objects will be apparent from the following description of the invention, setting forth the various processes, blends and combinations, and the selected steps, sequences and operations, as hereinafter explained in detail and set forth in the appended claims, accompanying drawings diagrammatically illustrating, wherein:

FIG. 1 is a plan view of an inverted boot showing my improved antislip surface applied thereto as a sole or layer;

FIG. 2 is a cross-sectional view taken on the line 2—2 of FIG. 1, looking in the direction of the indicated arrows; and FIG. 3 is a somewhat diagrammatic isometric view of a pad formed according to the invention, and shown as a heel for a boot.

In an attempt to provide an improved boot sole, it was desirable to take advantage of the antislip properties of aluminum. It was found however, that aluminum inserts in a rubber matrix, for a sole of a boot, would not function properly and presented a problem because they would not adhere to the elastomer. Bonding adhesive agents are known for this purpose, however, for a bonding agent to hold an insert in an elastomer which is being continually distorted did not appear feasible or available. It was discovered that an aluminum chip could be held in a matrix if it were thin and of irregular form. It would easily bend responsive to flexure of the boot sole and at the same time which would present substantial surface area to attain as much adhesion and binding as possible. Further, a thin chip of an irregular form naturally interlocks itself into the elastomer matrix, in contrast to a rigid insert. Subsequently, it was discovered that machine shop cuttings and shavings of various types had those desirable basic characteristics, whether the cuttings were from a lathe, milling machine, shaper or a saw. It was discovered that practically any type of aluminum or aluminum alloy shavings would adequately serve the purpose. Cuttings from various manufactories of various aluminum products, available at a number of factories, as a waste material, are generally similar in certain respects. In the first place, those chips are usually comparatively thin and they are cupped or curled and are warped and of irregular surfaces, and with the edges of those chips being serrated, due to the cutting when they are formed. Such jagged or serrated edges lend to mechanical adherence of the elastomer to the chips, to supplement the adherence of the chips onto the elastomer. The cuttings found most suitable for the invention vary considerably in form and size, with the usual thickness of the chips varying from five ten-thousandths (0.0005) of an inch to several hundredths of an inch, and, generally, the chips were less than one-sixteenth of an inch in thickness. The length of the chips vary considerably, sometimes being continuous as when they are turned as coils in a lathe, in which case the chips must be broken up into short lengths. The width of these chips may vary from a minimum of one one-hundred twenty-eighth of an inch to a maximum of as much as about three-sixteenths of an inch, while the length may vary, as heretofore mentioned, from approximately one-eighth inch to approximately three-fourth inch. In connection with chips of the sizes mentioned, there will be a certain amount of comparatively fine chip particles, much smaller than that specified, which will be blended into the material and which will also add to its utility. Prior to the impregnating of the chips into the elastomer, they are preferably prepared by cleaning, except in the case where the chips are cut with a machine oil of a type which is compatible with the elastomer being used. In the cleaning of the chips, they may be further prepared by a coating of the chips with a suitable bonding agent, however, it was found that the various bonding agents available were not entirely satisfactory for this purpose, that is for coating these myriad of thin and fine coiled chips. The amount of the chips impregnated into the elastomer may be varied considerably, and it was found that where natural rubber was used as the elastomer that the proportion of chips to the elastomer, measured volumetrically, varies from a maximum of about 40 percent as the maximum amount of the chips which could be put into the rubber, while the minimum amount to have a nonslip surface is approximately 10 percent of the total combined volume. If an amount exceeding the maximum of 40 percent is used the final product does not have adequate strength. If the percentage of the chips in the mass is less than that 10 percent of the combined volume, the antislip characteristic is significantly diminished. In the case where a synthetic resin elastomer is used for the matrix, of a type such as Neophrene, the volume of the chips may be substantially increased to approximately as much as 60 percent of the combined volume, and providing not less than 10 percent thereof. These percentages are rough approximations. The actual desired amount of chips to the elastomer may be varied somewhat depending upon the average size of the chips, the thickness of the chips and their overall average size and configuration. A desirable blend of any given type of elastomer may be easily obtained by simple experiment within the ranges stated.

The desirable properties of an elastomer, whether natural or synthetic, which can be used in connection with the chips, are as follows:

First, a natural tenacity of the elastomer to the metal is desirable although it is recognized that high strength bonding of an elastomer to aluminum surface cannot be easily obtained. This was found to be the case for all of the tests hereinafter described. Another desirable and essential property of the elastomer must be that the elastomer must be in a liquid or putty form, whether uncured or cutback with a solvent, so that it is capable of permitting the chips to be blended into the matrix formed thereof. Additionally, the elastomer must be capable of being cured or finished, as by vaporization of the solvent, if of that type, or of oxidation if of another type, to a final condition wherein it is tough but flexible. The degree of flexibility of this cured product, with the aluminum chips interspersed therein, may vary considerably, but it is desirable to provide an elastomer which will flex when the product is affixed to a flexible boot sole. The range of curing can be from a moderately rigid member to one which is quite pliable, with the durometer of the cured impregnated material varying from 20 to 80. It is to be noted that conventional fully cured hard rubber is generally somewhat too hard for use of the present invention.

A necessary characteristic of applicant's elastomer resides in the property of being capable of being applied to the sole of a boot or shoe while it is in a liquid or putty state and before its final cure or finish, or if it is cured or finished as a pad it must be capable of being applied to a shoe sole by any suitable adhesive, and capable of yielding with the shoe sole without being torn loose.

Elastomers which I have used, representative of the following examples, include, first, natural rubber which was obtained as a sheet of raw uncured such material, with one type being a natural raw uncured rubber, and a second type being a sheet of uncured rubber stock having lamp black therein and commonly known to the trade as tire retreading camelback. Said natural rubbers used were by one method separately prepared by dissolving them in solvents, such as methyl ethyl ketone, into a semiliquid state wherein the chips could be mixed. The chips were interblended in that resultant natural rubber semiliquid mass in a suitable type of a mixer. By another method, in the case of the sheet of natural rubber, the aluminum chips were interblended thereinto by being ground into the rubber by a press roller of a suitable type such as a pugmill.

Another type of elastomers used has been a synthetic Neoprene elastomer, and which elastomer was obtained as a Latex, commonly known to the trade as the E. I. DuPont De Nemours Company's Neoprene Latex numbers 650, 635 and 601a. These latter elastomer types are milklike substances.

Another type of synthetic elastomer has been a polysulfide liquid polymer, produced by Thiokol Chemical Corporation, and designated as Thiokol's LP-2, of said corporation, being a comparatively thick viscous polymer matrix, in its uncured form; produced in two components to be mixed together, with one component being a thick liquid and the other a thick paste.

Another type of elastomer used was substantially a cured Neoprene which had been dissolved in some solvent, probably methyl ethyl ketone, wherein the material was fluid enough to mix with the chips.

A further elastomer consisted of a Polyurethane dissolved in methyl ethyl ketone, which finished out after being mixed with chips, all as hereinafter set forth more specifically in the following examples.

The following examples are given to assist in understanding my invention, but I am not to be restricted by the specific materials or procedures therein, as they are merely exemplary of the invention.

EXAMPLE 1

As a first example of my invention, I take approximately 5 pounds of natural uncured rubber, which was provided as a sheet, of semidoughlike material of approximately 25 durometer hardness. The proportion of one part of such aluminum chips to about five parts of such rubber was blended into a final mass in a comparatively heavy roll mill press 1,000 pound roller machine until the chips were uniformly impregnated press-mixed or dispersed throughout the matrix mass and the mass uniformly formed as a sheet of about three-eighth inch thickness. Individual boot soles were then cut out of said ⅜-inch sheet, and these soles were cured in an electric heating press apparatus, at a pressure not exceeding 20 pounds pressure and with the curing at 240° F. for approximately 8 minutes and allowed to cool in the mold for approximately 8 minutes and then removed from the mold. A shoe sole made according to this example of my invention was comparatively soft and elastic, with the resultant rubber having a durometer hardness of approximately 40. Compared with the ordinary rubber curing processes, this cure might be considered as being undercured. However the softness was considered a desirable characteristic of the same. The sole was affixed to the bottom of a boot by rubber cement. In effecting this cure of the aluminum impregnated rubber, it was noted that the heat capacity of the aluminum, in retaining heat, had to be taken into consideration after the heat was turned off in arriving at this total cure and that the technician performing the cure operation would have to gear his cure time to account for this factor.

EXAMPLE 2

About 3 pounds of 35 durometer uncured camelback sheet of natural rubber, of the type used in tire retreading, was dissolved in carbon disulfide, in approximately equal proportions, forming a thick gel. To this gel, by volume, one part of such aluminum shavings was stir blended with about three parts of the gel. That resultant mixture matrix gel was then poured into a sole-shaped mold of the thickness of one-fourth of an inch. There was a natural evaporation of the carbon disulfide occurred and the rubber in the mold was cured by placing the mold and contents in an electric hot plate pressure machine at a temperature not exceeding 240° and at a pressure on the mold contents of not exceeding 20 pounds for approximately 8 minutes. The sole pad was allowed to remain in the mold for approximately 8 minutes and was then removed. The durometer of this final sole product was approximately 30. The final result was softer than the original stock, it was sufficiently strong and coherent to form a sole which could be affixed as a sole to the bottom of a boot.

EXAMPLE 3

The same as example 2, with that heat application excepting that no pressure was applied to the sole during that cure. The cure appeared to be substantially the same as that previously obtained with pressure except that the appearance of the final product was not as smooth, and it was of a resultant durometer of about 25.

EXAMPLE 4

The same as example 2, excepting a pressure of only approximately 100 pounds was applied to the mold contents without any application of heat. The sole was removed from the mold then and allowed to air cure for 5 days time, when it was found to be of about 20 durometer and sufficiently rigid to be secured to and used as the sole of a boot.

From the above examples, it is obvious that a technician skilled in the rubber fabricating art can select such milled or suitable aluminum chips, interblend the quantities of the same in the rubber, either by masticating the same into the rubber in a mill, or by dissolving the rubber into a gel or liquid and subsequently curing the same into a selected comparatively soft condition of a boot sole, where the sole will bend over and in adherence of the uneven contour of stones which the wearer steps upon. Through such adherence, the aluminum surfaces of the shavings or chips in the sole and exposed to the objects stepped on facilitate gripping that object and minimize the chances of the wearer slipping.

In the following examples the use of synthetic rubber is set forth. Synthetic resins having elastomeric properties and are commonly referred to as synthetic rubber.

EXAMPLE 5

The Polysulfide liquid polymer identified as Thiokol LP2, manufactured by Thiokol Chemical Corporation, of Trenton, New Jersey, provided as a two component material: the resin and the accelerator. According to recommended practice, 15 parts of resin to one part of accelerator, by weight, were blended together to produce a polysulfide rubber at room temperature. A small batch of this material, approximately 6 fluid ounces, was mixed and prepared cleaned aluminum chips were immediately added to that blend mixture before the accelerator began to act. The amount of the chips so added was at least about 25 percent by volume and not over 40 percent by volume compared to the amount of that rubber mass. That chip mixture blend was then substantially immediately spread-on applied to the sole of an inverted boot, as a thick paste. That polysulfide rubber blend mixture adhered well to the surface of that boot sole and was set in approximately 30 minutes, and was then substantially completely air cured in approximately 4 hours, without any heat or pressure application at room temperature, resulting in a resilient and flexible nonslip surface having aluminum chips impregnated of about 50 durometer. In this example the setting occurs quite rapidly and for that reason it is not practical to disperse more than about 33 ⅓ of the chips by volume into that LP2 matrix rubber. A subsequent test indicated that when 50 percent of such chips by volume was added to such an LP2 Thiokol mixture the final product did not have adequate strength to serve the desired purpose.

EXAMPLE 6

A solution of Neoprene rubber, of the type dissolvable in volatile substances, was next used. It was obtained commercially from the Young Company, of San Diego, California, which merchandises the material as a glue under the trade name of Young's "Anchor Weld." Such Neoprene liquid rubber solution was immediately mixed with about a 50 percent quantity of aluminum shavings and that mixture was then substantially immediately applied to the sole of an inverted boot when it set in approximately 3 minutes and was dry or finished in about 2 hours. The shavings were held in place by this neoprene rubber glue, though the body of the rubber or matrix was somewhat deficient, and the final sole product was somewhat stiff, about 80 durometer, but, nevertheless, it was sufficiently elastic to cause the chips to remain on the boot soles when they were in use and to which affixed and did provide a nonslip sole surface at that sole.

EXAMPLE 7

An uncured neoprene latex, manufactured by E. I. DuPont De Nemours, Inc., under the trade name designation of Neoprene Latex 635, provided as an uncured milklike liquid, was used. Such aluminum chip shavings were mix-blended with this latex uncured liquid in about equal parts by volume. A suitable substantial volume of clay was added to the mixture to provide body and hardness. That blend mixture was poured into a suitable sole mold and was then allowed to set and cured at room temperature after a 2-day period, when the material set in the mold into its form, and after a 5-day total period the curing was completed in that mold to the final product of about 80 durometer. The product so formed was then removed from the mold and was a good antislip surface or pad capable of easily being attached as a sole to the sole of a boot. The type and amount of clay filler used could be varied, to have a quicker curing and better flexibility, among others.

In the use of neoprene the use of consistently larger quantities of aluminum chips can be interblended into the mix, as compared with a matrix mix of natural rubber or of Thiokol heretofore disclosed.

EXAMPLE 8

Said Neoprene Latex No. 635 of said DuPont Company, as in example 7, was used, in equal proportion of aluminum chips, and that latex, without any clay or other additives or inhibitors, and that mixture was immediately spread-applied directly to the inverted clean sole surface of a rubber boot. This neoprene on such application was permitted to oxidize in the air, and it was discovered that the cure was comparatively rapid, and a blended resultant mass thereof was formed approximately three-sixteenth of an inch on the inverted boot sole surface. The material was set in 4 hours and was fully oxidized or air cured at about 50 durometer hardness in approximately 48 hours, in the form of my flexible antislip aluminum impregnated surface ready for use as the sole of the boot.

In the development of the invention, as set forth in the foregoing examples, it became apparent that Neoprene would be the preferred type of elastomer. Investigations were made as to the manner in which the neoprene chips blend would cure, on aeration at room temperature, from the unpolymerized state in the milklike elastomer. It appears that the usual curing agents for neoprene are metal oxides, and that such curing agents are available for the purpose. However, it was discovered that, in working with the Neoprene, that oxides, in the form of thin oxide coatings on the aluminum chips, were sufficient to effect the cure without the addition of the commercial curing agents, when the neoprene latex-aluminum chips mixed mass was exposed to the air.

EXAMPLE 9

The same as example 8, except that the latex used was said DuPont's milklike uncured latex number 650, a neoprene latex similar to the latex 635 of example 8, excepting, insofar as the test was concerned, the viscosity of the No. 650 material was much higher and so the blend was easier to handle and spread upon the inverted sole of a boot; and, also, use of the No. 650 material with the aluminum chips blend oxidized much faster, requiring less time to get the desired completely cured substantially similar product upon the sale of a boot, in about one-half the time that set forth in example 8.

It was discovered that a convenient mode of applying the neoprene latex-aluminum chips blend to the sole of an inverted boot, was by first applying an upstanding mastic tape about the periphery of the edge of the inverted sole and heel portions of the boot, to form a damlike wall around that surface, approximately three-fourths inches high, and holding the boot inverted, to hold the liquid latex in place on the sole while it was curing. It is believed that this simple temporary tape expedient, which permits an individual so to apply such blend material to the inverted soles of his boots, without special equipment, constitutes, in the overall steps, an important step to facilitate the effective application of the material.

From the foregoing examples and disclosure, it is apparent that such aluminum chips can be interblended with other types of synthetic elastomers which have the basic properties suitable for the purpose at hand. It is known that excellent tough and elastic elastomers can be obtained from synthetic resins, such as polyurethane and Butyl rubber. A test was made with polyurethane to determine that a mixture of aluminum chips would be compatible, and it was found that it could be used for the purpose at hand, however, equipment for making examples of this material was not available to the inventor. Butyl rubber can be kneaded and dissolved in a manner very similar to natural rubber, and it follows that this material can also be mixed with the aluminum chips.

From the foregoing descriptions and examples, it becomes apparent that this invention is broader in scope than any of the examples precisely set forth, and, therefore, I wish to be bound only by the teaching, scope and spirit and by the definitions of matters as in the hereunto appended claims.

What I claim and desire to secure by Letters Patent is:

1. As a product, a flexible layer having a nonslip surface and adapted to be secured to an article such as to the sole of a shoe, comprising: (a) a flexible body proportioned to cover the intended surface and having a thickness in excess of one-sixteenth of an inch and of an elastomeric component constituting a matrix of 20 to 80 durometer; and (b) waste aluminum chips of diverse forms and shapes each larger than one one-hundred twenty-eighth inch and each characterized by a thickness of less than one-sixteenth of an inch and blended with and interlocked into said matrix, said chips being not less than 10 percent by volume of the total final mass.

2. A product as defined in claim 1, and characterized further by the characteristic wherein said elastomeric matrix is formed of natural rubber.

3. A product as defined in claim 1, and characterized further by the characteristic wherein said elastomeric matrix is formed of synthetic rubber.

4. A product as defined in claim 1, and characterized further by the characteristic wherein said elastomeric matrix is formed of synthetic neoprene rubber.

5. A product as defined in claim 1, and characterized further by the characteristic wherein said elastomeric matrix is of natural rubber, and wherein the proportion of aluminum chips to the rubber is more than approximately 10 percent and less than approximately 40 percent by volume of the final mass.

6. A product as defined in claim 1, and characterized further by the characteristic wherein said elastomeric matrix is formed of Neoprene synthetic rubber, and wherein the proportion of aluminum chips to the matrix is more than approximately 10 percent and less than approximately 60 percent by volume of the final combined mass.

7. A product as defined in claim 1, and characterized further by the definition of the flexible body wherein: (a) that body is substantially a layer having a thickness of substantially between one-sixteenth and three-eighths of an inch; (b) wherein said elastomeric component has the characteristics of Neoprene having a durometer hardness of between 20 and 80; (c) wherein said aluminum chips are waste mill cuttings each having a width of approximately between one one-hundred twenty-eighth of an inch and three-sixteenths of an inch and each having a length of approximately between one-eighth and three-fourths of an inch; and (d) wherein said chips constitute by volume at least 10 percent and less than 60 percent of the volume of the final product.

8. The method of forming and applying a flexible layer having a nonslip surface and adapted to be fixed to the sole of a shoe or the like, including the steps of: (a) interblending waste aluminum chips of diverse forms and shapes and generally characterized by each chip being larger than one one-hundred twenty-eighth of an inch and having a thickness of less than one-sixteenth of an inch into an uncured unfinished elastomer in proportion such as to permit the elastomer to form a matrix capable of holding and interlocking the chips within it and in which matrix total final resultant mass said chips comprise at least approximately 15 percent by volume; and (b) curing and finishing the elastomer as a layer thicker than one-sixteenth of an inch and adapted to cover the selected surface and being of a finished durometer hardness within the approximate range of 20 to 80; and (c) applying said elastomer blended mass onto a boot sole or the like.

9. In the method of forming such a flexible layer as set forth in claim 8, wherein the elastomer is a semiliquid gelled natural uncured rubber and wherein said aluminum chips are mixed therein in approximate proportion of between 10 and 40 percent of the total volume of the material.

10. In the method of forming such a flexible layer, as set forth in claim 8, characterized by the definition of the elastomer being an uncured latex of neoprene rubber and wherein said aluminum chips are mixed therein in proportion of between 10 and 60 percent of the total volume of the material.

11. In the method of forming such a flexible layer, as set forth in claim 8, characterized by the definition of the elastomer blend being cured and finished as a layer on being affixed to a boot sole by an adhesive.

12. In the method of forming such a flexible layer as set forth in claim 8, wherein the steps of forming and the steps of applying are combined to simultaneously form and cure and finish said layer upon the boot sole when the layer is applied to the sole.

13. In the method as set forth in claim 8 wherein said elastomer is a neoprene latex, and therein said uncured blend of the latex and the chips is comparatively of fluid viscosity, wherein said steps of forming the layer and said step of applying the layer to the boot sole is performed as a single operation, and the further step of inverting the boot to pour the liquid upon the sole.

14. A soft, resilient nonslip article comprising a matrix of an elastomer of a partially cured rubberlike stock of a hardness varying from 20 durometer to 80 durometer and aluminum waste shavings of irregular form interspersed within the matrix with portions of some of the shavings being exposed at the surface of the article to assist in the nonslip characteristics of the aluminum shavings when wet.

15. The method of producing an antislip 20 to 80 durometer product affixed onto a base and having an exposed surface, wherein said product is composed of an elastomer which is blended with waste aluminum chips each larger than one-one hundred and twenty-eighth inch and in the approximate proportion of 10 to 50 percent by volume of the blend, including the steps of:
  a. Converting the elastomer to a liquid state by blending the same with a volatile solvent adapted to dissolve the elastomer;
  b. Mixing the waste aluminum chips each larger than one-one hundred and twenty-eighth inch with the liquid blend;
  c. Applying the mixture to the base to form the exposed surface; and
  d. Permitting the solvent to evaporate therefrom.

* * * * *